(12) United States Patent
Schutte

(10) Patent No.: US 6,421,752 B1
(45) Date of Patent: *Jul. 16, 2002

(54) ELECTRONIC APPARATUS

(75) Inventor: Herman Schutte, Eindhoven (NL)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/304,595

(22) Filed: May 4, 1999

(30) Foreign Application Priority Data

May 4, 1998 (EP) .............................. 98201435

(51) Int. Cl.⁷ .................... G06F 13/368; G06F 13/40
(52) U.S. Cl. ............................ 710/119; 710/305
(58) Field of Search ........................... 710/107–125, 710/305–317; 326/114, 115

(56) References Cited

U.S. PATENT DOCUMENTS

| 4,964,141 A | * | 10/1990 | Matsushima et al. | 375/354 |
| 4,984,190 A | * | 1/1991 | Katori et al. | 709/237 |
| 5,410,542 A | * | 4/1995 | Gerbehy et al. | 370/364 |
| 5,444,847 A | * | 8/1995 | Iitsuka | 710/107 |
| 5,559,502 A |   | 9/1996 | Schutte | 340/825.21 |
| 5,675,811 A | * | 10/1997 | Broedner et al. | 713/323 |
| 5,793,993 A | * | 8/1998 | Broedner et al. | 710/126 |
| 5,819,051 A | * | 10/1998 | Murray et al. | 710/107 |
| 5,852,406 A | * | 12/1998 | Edde et al. | 340/825.06 |
| 5,878,234 A | * | 3/1999 | Dutkiewicz et al. | 710/110 |
| 6,073,186 A | * | 6/2000 | Murray et al. | 710/11 |
| 6,182,175 B1 | * | 1/2001 | Nihouran | 710/105 |

FOREIGN PATENT DOCUMENTS

NL  DE3738800  5/1989  ........... H04L/25/02

OTHER PUBLICATIONS

"Data Handbook IC20: 80C51 based 8–bit Microcontrollers" issued by Philips Semiconductors in 1994, pp. 1141–1159.

* cited by examiner

*Primary Examiner*—Sumati Lefkowitz
(74) *Attorney, Agent, or Firm*—Steven R. Biren

(57) ABSTRACT

An electronic apparatus uses a bus conductor driven by wired logic to arbitrate between stations. When arbitration is decided, the apparatus switches to a higher speed mode by supplying additional current to the bus conductor, so that the winning station pulls the potential on the bus conductor against a greater current and the potential rises faster when the station stops pulling the potential.

9 Claims, 3 Drawing Sheets

ELECTRONIC APPARATUS

FIELD OF THE INVENTION

The invention relates to an electronic apparatus comprising a bus which interconnects a number of stations.

BACKGROUND ART

The I2C bus is an example of a bus for connecting a number of integrated circuit stations. The I2C bus is described in the "Data Handbook IC20: 80C51-based 8-bit microcontrollers" issued by Philips Semiconductors in 1994, pages 1141–1159. The I2C bus comprises a bus made up of a clocksignal conductor and a data-signal conductor and allows for communication of data via the data-signal conductor, clocked by a clock signal on the clock-signal conductor.

Before or during data transmission, stations which are connected to the bus must execute an arbitration protocol to determine which station becomes bus master. During arbitration, the logic level of the signals on the data-signal and/or clock-signal is a wired logic function of signals from different stations participating in arbitration.

In case of the I2C bus, the stations control the logic levels on the clock-signal conductor in such a way that the slowest station determines the clock speed and the stations attempt to write its own information to the data-signal conductor through the wired logic in synchronism with the clock signal. This allows these participating stations to judge from the logic levels on the data signal conductor whether they have won or lost arbitration; a station loses arbitration if it does not succeed in writing its own information. The losing stations stop participating in arbitration, so that eventually only the winning station remains active.

For wired logic operation load circuits are connected to the data-signal conductor and the clock signal conductor and each station contains pull-down transistors to pull down the potential on these conductors against the load circuit as required by the arbitration protocol.

The load circuits contain for example resistors connected between the data-signal conductor and the clock-signal conductor respectively and a power supply connection. It is also known to connect a current source in parallel with such a resistor and to switch-on this current source once the resistor has sufficiently pulled up the potential on the relevant conductor.

The current supply capability of the load circuits in combination with the capacitance of the bus conductors determine the speed with which data can be communicated over the bus, in terms of the time needed by the load circuits to charge the capacitances of the bus conductors. In the I2C bus the nominal current supply capability of the load is 3 mA, bus capacitance is at most 400 pF and as a consequence the bus speed must be lower than 400 kbit per second.

It is desirable to increase the speed with which data can be communicated over the bus. In principle, this can be achieved by increasing the current supply capability of the load circuits.

However, there is a large base of existing integrated circuits capable of interfacing to the I2C bus designed to be able to drive the potential of the bus conductors to a relevant logic level against a load with the existing current supply capability of 3 mA, but not against a load with a substantially increased current supply capability. If one merely uses a load with increased current supply capability and new stations capable of driving such a load, the new stations will be unable to cooperate with integrated circuits from the existing base.

SUMMARY OF THE INVENTION

Amongst others, it is an object of the invention to provide for an electronic apparatus with a bus connecting a number of stations which allows for increased speed of data communication in a way that is compatible with arbitration requirements of slower stations, such as those designed for a slower bus.

The electronic apparatus according to the invention is set forth in claim 1. According to the invention, the current supply capability of the load circuit connected to the bus conductor is increased upon detection of victory of one station in wired logic arbitration.

Thus, the speed of communication via of the bus conductor may be increased when that one station is a station capable of driving against a load with an increased current supply capability, or when the one station indicates that it will cause the bus conductor to be driven by another station capable of driving against the load with an increased current supply capability. On the other hand, it is still possible to arbitrate with stations from the existing base of stations which do not have the capability to drive against the load with increased current supply capability. When such a station is connected to the bus conductor and it wins arbitration, the current supply capability is not increased.

Preferably, upon completion of data communication, the current supply capability of the load circuit is decreased to its original value so that the conductors are immediately available for arbitration by all stations after completion of data communication.

Preferably, the electronic apparatus increases the current supply capability or not under control of whether the station that wins arbitration is a station capable of driving against the load with increased current supply capability or not capable of said driving respectively. Thus, stations from an existing base of station which are not capable of driving against the increased load can still communicate data via the bus.

In an embodiment of the invention, each of the stations that is capable of participating in arbitration and driving against the load with increased current supply capability contains its own switchable load circuit. Such a station switches this load circuit or these load circuits to an increased current supply capability when it detects that it has won arbitration and it wants to communicate at high speed.

Thus it is unnecessary to include a load circuit independent of the stations with the ability to increase the current supply to the bus conductor. At the same time, it is avoided that more than one load circuit is switched to an increased current supply capability state so that the stations would be incapable of driving against the combination of these load circuits.

The I2C bus has two bus conductors one for a clock signal and one for a data signal. Changes in data applied to the data-signal conductor are effected only at timing distances of one period of a clock signal on the clock-signal conductor. Thus, the need for high speed on the data signal conductor is less than that on the clock-signal conductor.

Accordingly in another embodiment of the invention only the load circuit connected to the clock-signal conductor is switched to the increased current supply state; the load circuit connected to the data-signal conductor is kept in its original current supply state throughout all communication, independent of whether arbitration has been ended or not. Thus, large driving transistors for the data signal conductor are not needed.

In the 12C bus data may be transmitted by the station that has won arbitration, but also by other stations when they are instructed to do so by the station that has won arbitration. Preferably, the clock signal is always generated by the station that has won arbitration and the load circuit used to generate the increased current is particular to that station. Thus the currents involved in generating signals on the bus conductor remain local as much as possible so that as little as possible interference is generated by those currents.

BRIEF DESCRIPTION OF THE DRAWING

These and other advantageous aspects of the invention will be described further using the attached drawing. In the drawing

DESCRIPTION OF THE DRAWING

Figure 1:
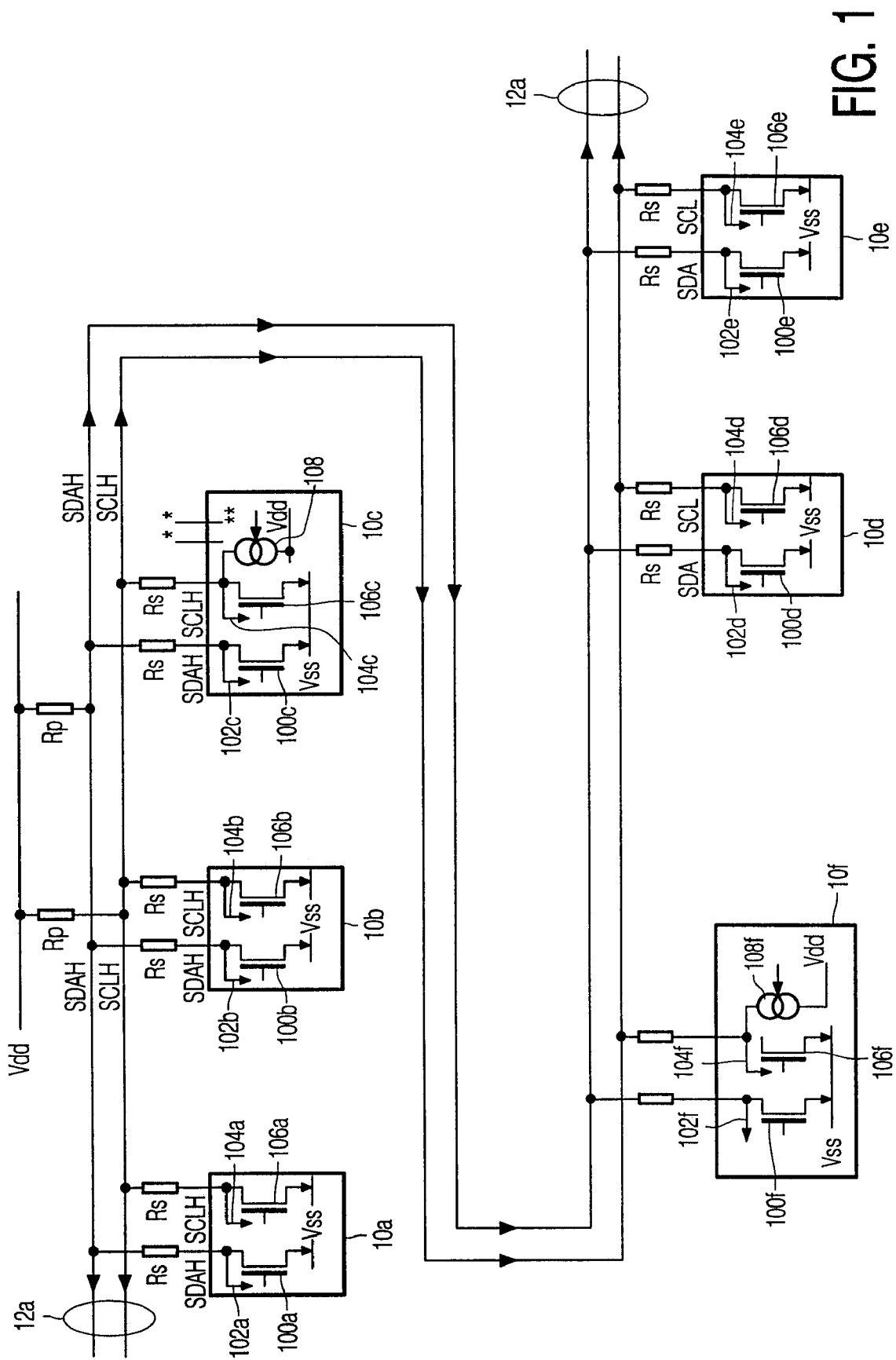
FIG. 1 shows an electronic apparatus with a bus

FIG. 1 shows an apparatus according to the invention with a communication bus 12a. The apparatus contains a number of stations 10a–f connected to the communication bus 12a. The bus 12a contains a clocksignal conductor SCLH and a datasignal conductor SDAH and a first power supply connection Vdd. The stations 10a–f are connected to the conductors SDAH, SCLH via resistors Rs, which serve for suppressing interfering pulses and ringing due to excessively fast signal edges. The clocksignal conductor SCLH is connected to a second power supply connection Vdd via a resistor Rp. The datasignal conductor SDAH is connected to a second power supply connection Vdd via a resistor Rp.

In each station 10a–f the connection to the datasignal conductor SDAH has a coupling 102a–f to an input filter (not shown). In each station the connection to the datasignal conductor SDAH is coupled to a first power-supply connection Vss via the channel of a transistor 100a–f.

In each station 10a–f the connection to the clocksignal conductor SCLH has a coupling 104a–f to a further input filter (not shown). In some of the stations 10c,d,f the connection to the clocksignal conductor SCLH is coupled to the first power-supply connection Vss via the channel of a transistor 106c,d,f. Such a transistor 106a,b,e is optional in the other stations 100a,b,e.

Two of the stations 10c,f contain a switchable current source 108, 108f coupled between the clocksignal conductor SCLH of the first section 12a and the powersupply connection Vdd.

Figure 2:
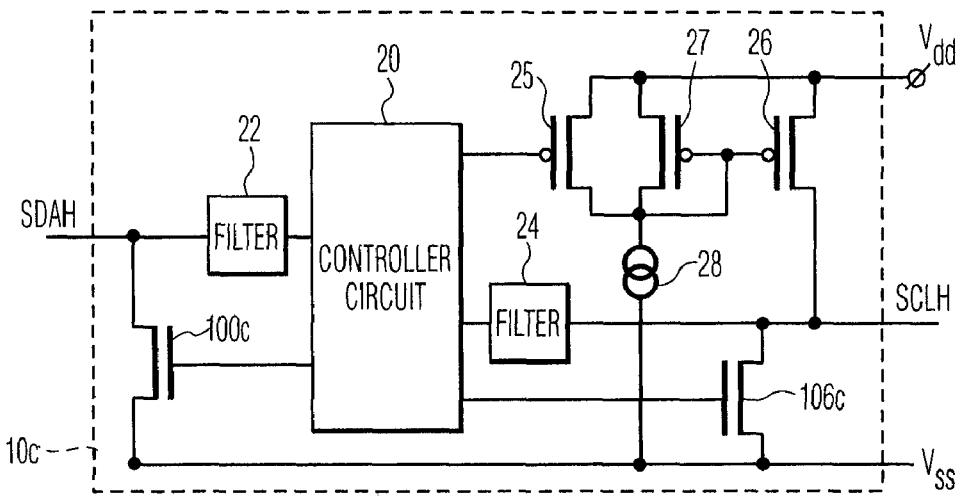
FIG. 2 shows a station for connection to a bus

FIG. 2 shows an example of a station 10c. The station 10c contains a controller circuit 20. The station 10c has a connection for the clock-signal conductor SCLH and a connection for the data-signal conductor SDAH.

The connection for the data-signal conductor is coupled to the controller via an input filter 22. The connection to the datasignal conductor SDAH is coupled to a first power-supply connection Vss via the channel of an NMOS transistor 100c.

The connection for the clocksignal conductor SCLH has is coupled to the controller 20 via a further input filter 24. The connection for the clocksignal conductor SCLH is coupled to the first power-supply connection Vss via the channel of an NMOS transistor 106c. The connection for the clocksignal conductor SCLH is coupled to the second power-supply connection Vdd via the channel of a PMOS transistor 26. The PMOS transistor 26 is part of a current mirror which also contains a further PMOS transistor 27 with its gate and drain coupled to the gate of PMOS transistor 26. The drain of the further PMOS transistor 27 is coupled to a current source 28 and to the second power supply connection Vdd via the main current channel of a control transistor 25. The gate of the control transistor 25 is coupled to the controller 20. Preferably PMOS transistor 26 is made so small that no damage to the apparatus may ensue if due to an error the current source 108 supplies current at the same time as a transistor 106a–f conducts.

The current source 28 may be a switchable current source (e.g. it may be connected to the current mirror 26, 27 via a switch) which is switched off when the station is in standby mode or when the station does not participate in communication.

In operation the apparatus can function in a first and second mode. In the first mode, the apparatus functions substantially according to the conventional 12C protocol. This protocol is described in the "Data Handbook IC20: 80C51-based 8-bit micro-controllers" issued by Philips Semiconductors in 1994, pages 1141–1159, which is incorporated herein by way of reference. Briefly, the protocol starts from a quiescent state of the bus, in which all conductors SDAH, SCLH are at the potential of the second power supply Vdd. A station (e.g. 10c) which wants to start communication generates a start condition by pulling the potential of the datasignal conductor SDAH to the first power supply potential Vss (by making the channel of transistor 100c conductive). The potential of the clocksignal conductor SCLH is left at the second power supply potential level Vdd (by leaving the channel of transistor 106c unconductive). This combination of signals on the conductors SDAH, SCLH is called a start condition. Subsequently, the station 10c attempts to generate a series of clocksignal pulses and datasignal levels, by either making the transistors 100c, 106c connecting the bus to the first power supply Vss conductive or unconductive. Data is validated by allowing the clocksignal conductors SCLH to be pulled toward the second power supply potential Vdd. Other stations 10a–f can delay clockpulses by keeping the clocksignal conductor pulled toward the first power supply potential Vss (using the transistors 106a–c connecting the clock signal conductors SCLH to the first power supply connection Vss). This allows the other stations 10a–f to take as much time as needed for handling the data.

The station 10c wanting to start communication (called the "master station") supplies a header as data to the bus 12a,b, followed by an address of a "slave" station 10a–f with which it wishes to communicate, and a bit (read/write bit) of data indicating whether the master station or the slave station is to write data to the bus. Each station 10a–f receives the datasignal and clocksignal from the bus 12a,b via its input filters (not shown) which remove noise, like spikes. Each station 10a–f determines if the received signals contain its address and whether read or write is needed and starts participating in communication accordingly.

Subsequently either the master station 10c or the slave station 10a–f supplies data to the bus 12a. After this exchange of data the master station 10c may issue a renewed start condition followed by another address of a slave station 10a–f with a read/write bit to exchange data with another slave station 10a–f. Finally, the master station generates a so-called "stop-condition" by allowing the potential of the datasignal conductor SDAH to be pulled from the first power supply potential Vss to the second power supply potential Vdd at a time when the potential of the clock signal conductor SCLH is left at the second power supply potential level Vdd.

In the 12C protocol data is transferred in units of 8 successive bits. Each unit is followed by an acknowledge bit in which a station 10a–f receiving the data may acknowledge reception by pulling the potential of the datasignal conductor SDAH towards the first power supply potential and then allowing the potential of the clock signal conductor SCLH to be pulled toward the second power supply potential Vdd. In case the receiving station 100a–f has missed the unit, or was unable to handle it, the receiving station allows the potential of the datasignal conductor SDAH to be kept pulled toward the second power supply Vdd during the clocksignal pulse for the acknowledge bit. In response, the station 100a–f transmitting the unit will for example retry transmission or break-off transmission.

More than one station 10a–f may attempt to become master station by generating a start condition and subsequent data. If such a station 10a–f notes that the bus 12a,b is busy (start condition has been transmitted and following no stop condition has yet been transmitted) it will wait until the bus 12a,b is quiet. This leaves the possibility that two stations 10a–f generate a start condition at substantially the same time. To solve this problem the stations 10a–f monitor the potential of the datasignal conductor SDAH. If this potential is pulled towards the first power supply potential Vss during any clock pulse (except acknowledge) at a time when the station 10a–f had left its transistor 106a–c unconductive in order to allow the potential of the datasignal conductor to be pulled towards the second power supply potential Vdd the station 10a–f concludes that another station 10a–f also attempts to become master station and ceases transmission until after the next stop condition (unless of course if it is addressed). This process is called arbitration, and a station 10a–f ceasing transmission is said to have lost arbitration.

The speed of operation in the first mode is determined by the time needed to change the level of the potential on the clock signal conductor or the data signal conductor from logic low to high and vice versa. In conventional 12C apparatuses, the most limiting factor is the time needed for changing the potential from low to high, because this is a passive pull-up by means of a current through resistor Rp.

When any of the transistors 106a–f pulls the potential of the clocksignal conductor SCLH towards VSS, this potential will be substantially at VSS. If none of these transistors 106a–f is conductive, the potential V of the clocksignal conductor SCLH will start to rise at a rate $$dV/dt=I/C$$

Herein I is the current supplied to the clock-signal conductor SCLH and C is its capacitance. The initial current is (Vdd−Vss)/Rp. Instead of the resistors Rp an equivalent current source may be used (i.e. a circuit that supplies a substantially constant current I=(Vdd−Vss)/Rp when the potential on SCLH is in a predetermined range of say between 0.3*Vdd and 0.7*Vdd taking Vss=0).

In the normal 12C mode of operation the current I is 3 mA at least initially and the capacitance is at most 400 pF. The potential V of the clock-signal conductor SCLH reaches a next logic level when it reaches a threshold VT of e.g. 0.7*Vdd (taking Vss=0). The time needed to reach this threshold VT is VT*C/I. This time determines the maximum speed of the bus.

Conventional 12C allows for some speed up, by switching on a current source in parallel with the resistor Rp once the potential on the bus conductor has risen perceptible. This increases the speed of change of the potential at the trailing edge of the change of the potential, but it does not effect the initial speed of change at the leading edge.

According to the invention, the apparatus provides for a second mode of operation in which it is possible to generate a speed of change of the potential from logic low to logic high beyond the speed that is possible in conventional 12C apparatuses.

In the second mode of operation ("the high speed mode") use is made of the switchable current sources 108, 108f to increase the speed with which the potential of the clock signal conductor SCLH of the first section 12a is pulled towards the second power supply connection Vdd. When the apparatus is in the second mode one of the current sources 108, 108f is kept on both when the potential on the clock signal conductor is logic low and when this potential is logic high (or at least until the this potential reaches the logic high level of e.g. 0.7*Vdd; when the potential approaches Vdd, the current from the current source will, of course, generally decline). The increased current increases the speed with which the potential starts to rise when the last of the transistors 106a–c that may pull down the potential on the clock-signal conductor SCLH stops conducting.

In the second mode of operation, the current source 108, 108f is able to supply for example an additional current of 3 mA, so that the total current supplied to the bus at any one time is 6 mA, which reduces the time needed to reach the threshold by a factor of 2. Thus the maximum possible speed is increased. In the first mode, the frequency of the clock-signal is typically below 400 kbit/sec. In the second mode, the frequency is at least a factor of 2 higher (an additional speed increase relative to conventional 12C may be realized by using a lower maximum possible bus capacitance, a lower power supply voltage and faster setup and hold times).

If any of the transistors 106a–c has to pull down the potential on the clock-signal conductor SCLH this transistor must be sufficiently large to drive down the potential against the current source 108, 108f.

The apparatus may also contain stations 10a–f which have been designed without attention to the second mode (e.g. with a pull-down transistor 106a–c that is so small that it cannot pull down the potential of the clock-signal conductor SCLH against one of the current sources 108, 108f). It is an object of the invention that these stations may also make use of the bus. To achieve this the second mode is combined with the arbitration and acknowledge process of the 12C protocol (i.e. the first mode).

Figure 3:
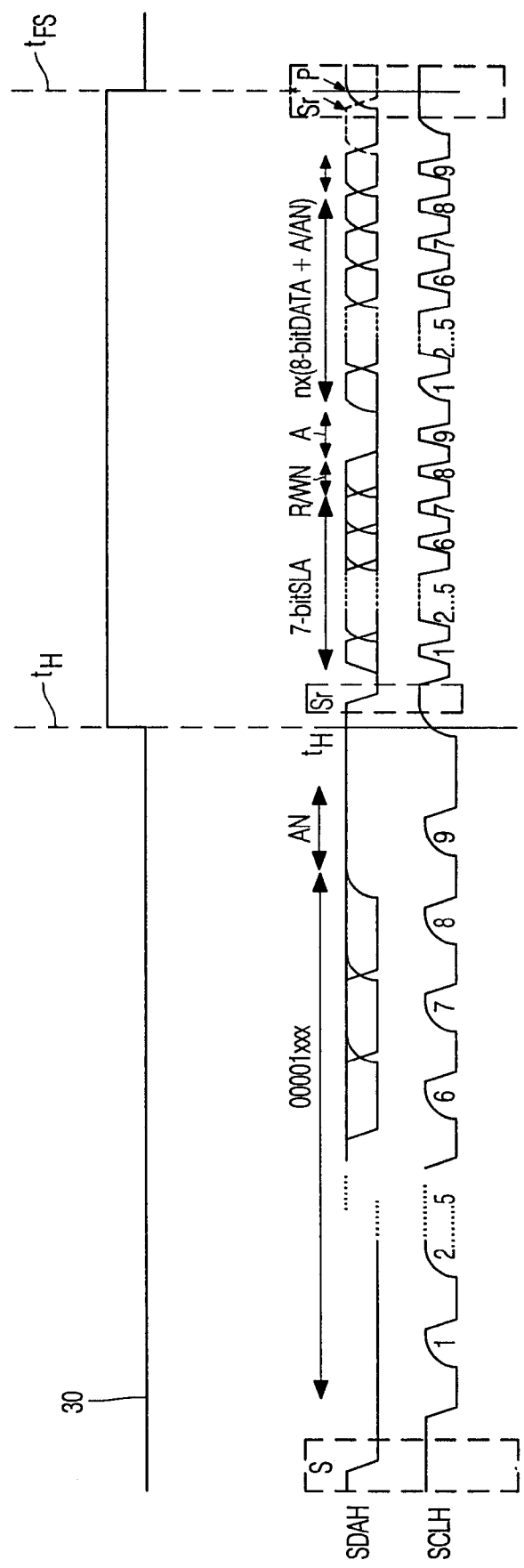
FIG. 3 shows a signal diagram of message transfer

FIG. 3 shows a signal diagram of message transfer using a combination of both modes. The signal diagram shows the potential of the data-signal conductor SDAH, the potential of the clock-signal conductor SCLH and a control signal 30 which determines whether the current source 108, 108f of a station is switched on or off (this control signal is e.g. the gate potential of the PMOS transistor 26 used to supply current to the clock-signal conductor from the second power supply connection Vdd).

Until a time tH message transfer proceeds in the first mode (conventional 12C) in which the current sources 108, 108f are switched-off. At first a start condition S is transmitted followed by header bits 1–9 using the conductors SDAH, SCLH. Arbitration takes place during transmission of the header in the first mode, which thus serves as an arbitration mode.

In addition to its conventional purpose of selecting a single master, the arbitration also has the purpose to ensure that a station 10a–f that wishes to exchange information in high speed mode can be sure that it may activate its current source 108, 108f. This is achieved by assigning a unique header to each station that can transmit in high speed mode (i.e. the unique header is different for each such station). These unique headers have a "lower" value than any header used for addressing stations during conventional 12C message transfer (lower in the sense that a station 10a–f putting a header used for conventional 12C message transfer on the bus 12a will always lose arbitration against a station 10a–f putting its unique header on the bus 12a,b for addressing stations. Of course a number of even lower addresses may be reserved for other purposes such as the "general start" signal known from 12C).

The unique headers are for example in the range 00001xxx (in order of transmission, 0 indicating that the datasignal conductor SDAH are pulled toward the first power supply potential Vss by the transistor 100a–f connecting the datasignal conductor SDAH to the first power supply connection, 1 indicating keeping that transistor 10a–f unconductive, "x" indicating a state of that transistor 100a–f specific to the unique code of a particular station). Normal 12C headers have at least one "1" bit in the first four bits. This selection of unique headers allows an additional range of headers 00000xxx, whose use by a station 10a–f allows guaranteed arbitration victory over the unique headers for special purposes such as a so-called general signal known from 12C.

A station 10a–f has the option to use either a conventional 12C header if it does not want to communicate in high speed mode, for example because it is known that the communication partner is not capable of working in that high speed mode, or its unique header if it wants to use the high speed mode. Transmission of the header in the first mode (conventional 12C) allows all stations to participate in arbitration. For reasons of compatibility the header may be optionally followed by a time-interval for an acknowledge bit, which, however, should not be used for acknowledge.

Upon completion of transmission of the header, the station e.g. 10c that wishes to communicate in the second high speed mode is able to determine whether it has become master station. In this case the station switches on its current source 108, 108f so that charging of the clock-signal conductor SCLH will take less time (this switch-on is shown by control signal 20).

If the station e.g. 10c wishing to communicate in the second (high speed) mode becomes master station by winning arbitration it switches to the high speed mode at a time tH. After that time tH the master station enters into a data transfer mode. In this mode the master station 10c transmits a renewed start condition Sr followed by an address of a slave station (bits 1–7) and a read/write bit (8). The address may be extended as defined for the 12C bus. This is followed by an acknowledge bit and a number of data units, each with its own acknowledge bit.

In the second, high speed or data transfer mode the master station the rising edges of the clocksignal are caused by the current from the activated current source 108 to the clock-signal conductor SCLH. This is indicated in FIG. 2 by using straight rising edges, instead of exponentially sloping rising edges which are shown in case the switchable current source is not activated and the rising edges are caused by the resistor Rp. The current source is kept active also during the time when the potential of the clock-signal conductor is pulled low. Therefore the pull down transistors 106a–c of the station that pulls down the clock signal conductor must be capable of driving the potential against the activated current source 108, 108f.

Optionally, a slave station 10a–b participating in communication with the master station 10c may delay the rising edge of the clocksignal by keeping its transistor 106a–b connecting the clocksignal conductor SCLH to the first power supply connection Vss conductive. The master station resumes generation of the clocksignal pulses only after the potential of the clocksignal conductor SCLH has risen. Thus a slave station 10a–b may delay transmission of the next data unit until it is ready to handle that data unit.

The possibility to delay the clock signal is particularly for acknowledgement, which occurs at the last bit of each data unit. In order to reduce the requirements on the pull-down transistor in the acknowledging station in this case, the master station 10c may leave the switchable current source 108 inactive at the rising edge of the clocksignal on the clocksignal conductor SCLH for each first bit of a data unit. In this case, the potential of the clocksignal conductor SCLH is left to rise due to charging via the resistor Rp connected to the second power supply connection Vdd.

After completing exchange of data with one slave station 10a–b, the master station 10c may generate a renewed start condition Sr* (indicated by a dashed line), followed by the address of a new slave station and a new read/write bit for a further exchange of data. This may be repeated any number of times. Instead of the renewed start condition Sr* the master station may generate a stop condition P indicating completion of message transfer and readiness for renewed arbitration. This ends operation in the second, high speed mode and causes a return to the first (conventional 12C) mode at a time tFS. Thereafter all the current sources 108, 108f are disabled.

As shown in FIGS. 1 and 2, the current source 108, 108f, 26 is contained in stations 10c,f. When a station 10c,f wins arbitration and it wants to communicate in the high speed mode, the station switches on its current source 108, 108f and drives the potential on the clock signal conductor against this current source. As an alternative embodiment, the current source 108, 108f that is switched on could be a central current source, provided for more than one master station. This central current source is switched-on when a unique header received via the bus indicates that the apparatus will communicate in high speed mode. That is, it is not necessary that the current source that is switched-on is the current source of the station that actually wins arbitration. It is sufficient that the amount of extra current is predictable at the time the station is made and does not depend on the apparatus in which the station is used, e.g. it must be excluded that say the current sources of more than one station in the apparatus are switched-on.

However, it is preferred that the current source 108, 108f is switched on of the station 10c,f that pulls down the potential of the clock-signal conductor, that is the station that wins arbitration in 12C busses. Thus the current drawn from that current source by the pull-down transistor 106c,f when the potential of the clock signal conductor SCLH is pulled to Vss remains local to the station 10c,f. This reduces interference caused by this current.

As an alternative, the current sources 108, 108f in FIG. 1 may be turned off each time the pull-down transistor 100a–f or 106c,f, is made conductive. This saves current, but requires accurate synchronization between turning the current source 26, 48 on/off and making the pull down transistor 100a–f, 106c,f conductive. This synchronization requirement reduces the maximum possible communication speed, especially when the active pull-down transistor 100a–f, 106c,f and the active current source 26, 48 are in different stations.

Figure 4:
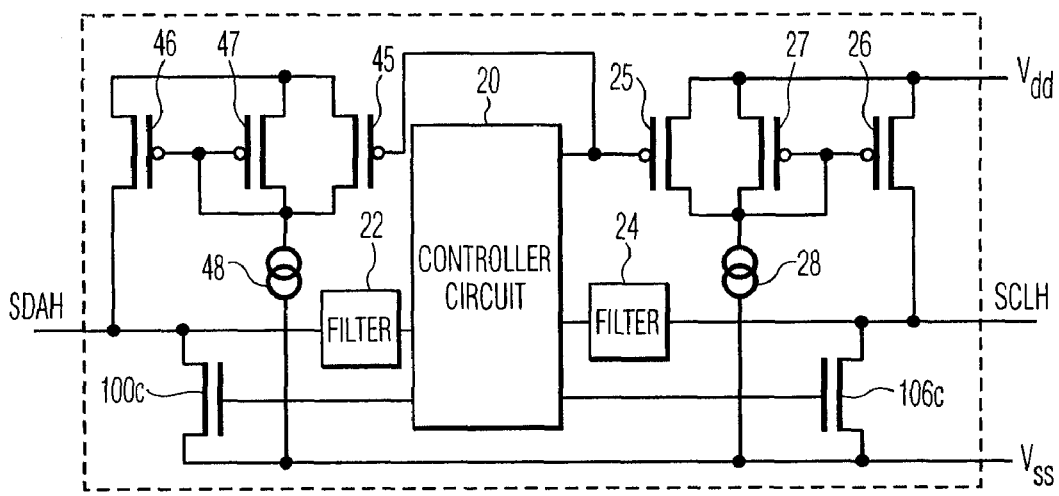
FIG. 4 shows a further station

FIG. 4 shows a further station according to the invention. This station is similar to the station of FIG. 2 and similar reference numbers are used. In the station of FIG. 4 the connection for the datasignal conductor SDAH is coupled to the second power-supply connection Vdd via the channel of a PMOS transistor 46. The PMOS transistor 46 is part of a current mirror which also contains a further PMOS transistor 47 with its gate and drain coupled to the gate of PMOS transistor 46. The drain of the further PMOS transistor 47 is coupled to a current source 48 and to the second power supply connection Vdd via the main current channel of a control transistor 45. The gates of the control transistors 25, 45 are connected together and controlled by the controller 20.

In operation the station of FIG. 4 increases the speed of potential level transitions towards Vdd in the high speed mode on both the clock signal conductor SCLH and the data signal conductor SDAH. Pull-down of the data signal conductor SDAH may be effected by the station of FIG. 4 itself (if data is transmitted from that station) or by another station that transmits data when the station of FIG. 4 has won arbitration.

As shown in FIG. 4, the control transistors 45, 25 receive the same control signal and therefore the current sources connected to the clock signal conductor SCLH and the data signal conductor SDAH are active at the same time. As an alternative, these current sources may be switched on and off independently of one another. This may be useful for example during transfer of an acknowledge bit. In this case the current source connected to the data signal conductor may be switched off just before the acknowledging station has to pull the potential of the data signal conductor and the current source connected to the data signal conductor may be switched off just before the acknowledging station may pull the potential of the clock signal conductor. Thus, the fast risetime afforded by the additional current source may be combined with low pull-down capability during acknowledge. In the 12C acknowledge protocol (see the reference to 12C) for example the time intervals during which the current sources are switched off may differ.

In busses such as the 12C bus, the logic level transmitted via the data-signal conductor is changed at most once every period of the clock-signal. Hence, there are at least two transitions of the clock signal for every transition of the data signal. Therefore, the speed requirements for the data signal conductor are less than for the clock signal conductor, and if the required speed is not too high, the station may be simplified by using only the current source connected to the clock signal conductor SCLH and omitting the current source connected to the data-signal conductor SDAH, as shown in FIGS. 1 and 2.

Figure 5:
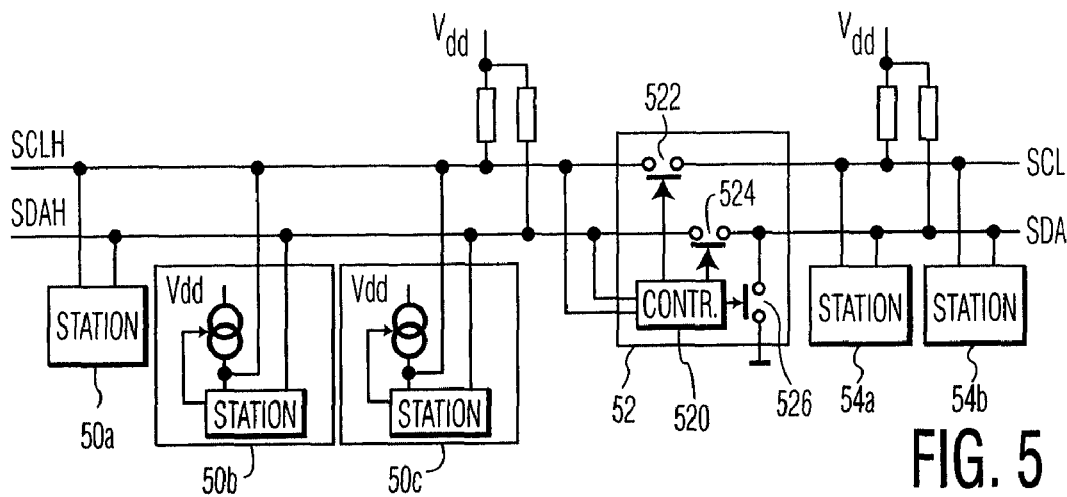
FIG. 5 shows an electronic apparatus with a bridge station.

In the particular case of the 12C bus, it may occur that conventional 12C stations produce errors if the signals on the clocksignal conductor and/or the datasignal conductor change at the frequencies used in the high speed mode, because the stations have been designed without taking account of the possibility of using the high speed mode. In this case, such stations may be coupled to the bus conductors via a bridge station. The bridge station separates each bus station in two parts, a first part to which conventional stations are connected and a second part to which stations are connected that do not produce errors when the high speed mode is used. The bridge FIG. 5 shows an apparatus in which the bus conductors have been divided into two parts ((SCLH, SDAH) and (SCL, SDA) by means of a bridge station 52. Stations 54a,b are connected to the first part SCL, SDA of the bus conductors. Stations 50a–c are connected to the second part SCLH, SDAH of the bus conductors. For the stations connected to the second part SCLH, SDAH it is known that they do not produce errors when high speed mode signals are present on the second part of the bus conductors SCLH, SDAH. For the stations connected to the first part SCL, SDA this is not known.

The bridge station 52 contains a controller 520, and switches 522, 524, 526. The controller 520 is coupled to the second part of the bus conductors SCLH, SDAH, and to control inputs of the switches. The two parts of the bus conductors SCLH, SDAH, SCL, SCLH are connected via switches 522, 524. The datasignal conductor SDA of the first part is connected to Vss via a switch 526.

In operation the bridge station normally controls the switches 522, 524, 526 normally so that the conductors SCLH, SDAH, SCL, SDA of the two parts of the bus are connected and the datasignal conductor SDA of the first part is not connected to Vss via the switch 526. However, when the controller 52 of the bridge station detects a switch to the high speed mode, for example from a unique header received via the bus, the controller makes the switches 522, 524, 526 disconnect the two parts of the bus from each other and pull the datasignal conductor SDA of the first part to Vss.

Thus, the stations connected to the second part SCLH, SDAH of the bus are capable of operating in the high speed mode as described hereinbefore at a time when the other stations are passive and disconnected from the second part of the bus SCLH, SDAH.

What is claimed is:

1. An electronic apparatus containing
   a bus conductor;
   a load circuit connected to the bus conductor for pulling a potential of the bus conductor towards a quiescent level;
   stations interconnected by the bus conductor, at least one of the stations comprising
      a wired logic drive circuit coupled to the bus conductor;
      an arbitration circuit connected to the wired logic drive circuit for executing an arbitration wherein the stations may each pull the potential against the load circuit;
   wherein the electronic apparatus comprises
      a detector for producing a detection signal when the at least one station wins the arbitration, for switching the load circuit to an increased current supply capability state in response to said detection signal, the load circuit in the increased current supply state supplying a greater current to the bus conductor than during arbitration at times when the potential is pulled against the load circuit and when the potential starts changing towards the quiescent level in the absence of pulling.

2. An electronic apparatus according to claim 1, wherein the electronic apparatus selectively switches the load circuit to the increased current supply capability state upon said detection dependent on whether or not the station that wins arbitration is a station that signals during arbitration an intention of driving the potential of the bus conductor against the load circuit with increased current supply capability.

3. An electronic apparatus according to claim 2, wherein each particular station which is capable of
   a) participating in arbitration and
   b) driving the potential of the bus signal conductor against the load circuit in the increased current supply capability state, comprises a respective own switchable load for supplying a current increase to the bus conductor, the particular station activating its own load circuit upon detection that the particular station has won arbitration.

4. An electronic apparatus according to claim 3, the electronic apparatus comprising a further bus conductor, data being transferred to or from the at least one station via the further bus conductor in synchronism with clock signals on the bus conductor, the at least one of the stations driving the potential of bus conductor against the load circuit in the increased current supply capability state both in case of transmission from and to the at least one of the stations in case the at least one of the station has won arbitration.

5. An electronic apparatus according to claim 4, comprising a further load circuit which contains all substantial current paths for pulling the further bus conductor towards the quiescent level, a maximum possible current supplied by the further load circuit always being the same, both during arbitration and data transmission also when the load circuit is in the increased current supply capability state.

6. An electronic apparatus according to claim 2, wherein the electronic apparatus selectively switches the load circuit to the increased current supply capability state upon said detection dependent on whether or not the station that wins arbitration
   a) is a station capable of driving a potential of the bus conductor against the load circuit with increased current supply capability and
   b) indicates a mode in which it wants to exchange data with a further one of the stations which is capable of driving the potential on the bus conductor against the load circuit in the increased current supply capability state.

7. An integrated circuit arranged for operating as a station in an electronic apparatus containing stations interconnected by a bus conductor, the integrated circuit comprising
   a connection for the bus conductor;
   a switchable load circuit connected to the connection for the bus conductor;
   a wired logic drive circuit coupled to the connection for the bus conductor;
   an arbitration circuit connected to the wired logic drive circuit for executing a wired logic arbitration using the bus conductor;
   a detector for producing a detection signal when the at least one station wins the arbitration, for switching the load circuit to an increased current supply capability in response to said detection signal, the load circuit in the increased current supply state supplying a greater current to the bus conductor than during arbitration at times when the potential is pulled against the load circuit and when the potential starts changing towards the quiescent level in the absence of pulling.

8. Integrated circuit according to claim 7, comprising a connection for a further bus conductor, for transfer to or from the integrated circuit via the further bus conductor in synchronism with clock signals on the bus conductor, the wired logic drive circuit driving the potential of bus conductor against the load circuit in the increased current supply capability state both in case of transmission from and to the integrated circuit in case the integrated circuit has won arbitration.

9. An integrated circuit according to claim 8, the integrated circuit driving the further bus conductor by wired logic drive only.

* * * * *